US012305837B2

(12) United States Patent
Sun et al.

(10) Patent No.: US 12,305,837 B2
(45) Date of Patent: May 20, 2025

(54) LED MOUNTING BASE, ADJUSTMENT MECHANISM WITH LED MOUNTING BASE AND RED DOT SIGHTING DEVICE WITH ADJUSTMENT MECHANISM

(71) Applicant: HUANIC CORPORATION, Shaanxi (CN)

(72) Inventors: Jianhua Sun, Shaanxi (CN); Xuewen Cheng, Shaanxi (CN); Yaofeng Zhao, Shaanxi (CN)

(73) Assignee: HUANIC CORPORATION, Shaanxi (CN)

( * ) Notice: Subject to any disclaimer, the term of this patent is extended or adjusted under 35 U.S.C. 154(b) by 1030 days.

(21) Appl. No.: 16/499,580

(22) PCT Filed: Mar. 16, 2019

(86) PCT No.: PCT/CN2019/078395
§ 371 (c)(1),
(2) Date: Jul. 29, 2021

(87) PCT Pub. No.: WO2020/001079
PCT Pub. Date: Jan. 2, 2020

(65) Prior Publication Data

US 2022/0163289 A1 May 26, 2022

(30) Foreign Application Priority Data

Jun. 25, 2018 (CN) ......................... 201810664345.5

(51) Int. Cl.
*F21V 21/18* (2006.01)
*F21Y 115/10* (2016.01)
(Continued)

(52) U.S. Cl.
CPC ................ *F21V 21/18* (2013.01); *F41G 1/30* (2013.01); *F41G 11/00* (2013.01); *F21Y 2115/10* (2016.08)

(58) Field of Classification Search
CPC .................................. F41G 1/30; F41G 1/345
(Continued)

(56) References Cited

U.S. PATENT DOCUMENTS 4,665,622 A * 5/1987 Idan ..................... G02B 23/105 356/252
8,966,805 B2 * 3/2015 Koesler ..................... F41G 1/30 42/111
(Continued)

FOREIGN PATENT DOCUMENTS

CN 206019473 U 3/2017
CN 107782199 A 3/2018
(Continued)

OTHER PUBLICATIONS

First Office Action regarding corresponding JP App. No. 2020-571557, mailed Dec. 1, 2021.
(Continued)

*Primary Examiner* — Reginald S Tillman, Jr.
(74) *Attorney, Agent, or Firm* — Dickinson Wright PLLC

(57) ABSTRACT

An LED mounting base, an adjustment mechanism with the LED mounting base and a red dot sighting device with the adjustment mechanism are provided in the present disclosure. The LED mounting base includes a sliding block base and a pedestal in which an LED chip is mounted at the middle of the front end surface thereof. A sliding slot parallel to the length direction of the pedestal is disposed on the front end surface of the sliding block base. One end of the sliding slot is a blind end, and the other end of the sliding slot is an open end. After the pedestal being disposed in the sliding
(Continued)

slot, the front end surface of the pedestal is parallel to the front end surface of the sliding block base.

19 Claims, 5 Drawing Sheets

(51) Int. Cl.
*F41G 1/30* (2006.01)
*F41G 11/00* (2006.01)

(58) Field of Classification Search
USPC .......... 42/111, 115, 125, 126, 135, 136, 113, 42/142, 114
See application file for complete search history.

(56) References Cited

U.S. PATENT DOCUMENTS

| | | | |
|---|---|---|---|
| 2005/0247296 | A1 | 11/2005 | Leisner |
| 2008/0092424 | A1 | 4/2008 | Keng |
| 2008/0216379 | A1 | 9/2008 | Javorsky |
| 2012/0140201 | A1 | 6/2012 | Grauslys et al. |
| 2015/0168104 | A1 | 6/2015 | Donovan |
| 2015/0198415 | A1 | 7/2015 | Campean |

FOREIGN PATENT DOCUMENTS

| | | | |
|---|---|---|---|
| CN | 208547292 | U | 2/2019 |
| WO | 2010039928 | A2 | 4/2010 |

OTHER PUBLICATIONS

Extended European Search Report mailed Jul. 22, 2021 for European Application No. 19825675.2, 8 pages.
English translation of Office Action regarding corresponding CN App. No. 201810664345.5; issued Sep. 7, 2023.

* cited by examiner

LED MOUNTING BASE, ADJUSTMENT MECHANISM WITH LED MOUNTING BASE AND RED DOT SIGHTING DEVICE WITH ADJUSTMENT MECHANISM

CROSS REFERENCE

The present application is a continuing application of International Application No. PCT/CN2019/078395, filed on Mar. 16, 2019, which is based upon and claims priority to Chinese Patent Application No. 201810664345.5, filed on Jun. 25, 2018, and the entire contents thereof are incorporated herein by reference.

TECHNICAL FIELD

The present disclosure relates to an LED mounting base, an adjustment mechanism with the LED mounting base and a red dot sighting device with the adjustment mechanism.

BACKGROUND

The LED chip in the existing red dot sighting device is mounted in the chamber of the back end of the bottom base, and the position adjustment of the LED chip mounting base is achieved by vertical or horizontal adjusting screws. But often because of the mutual interference of springs during an adjusting process, the occurrence of the mounting base skew is caused when the adjustment is in a single direction, resulting in lower precision and efficiency of the adjustment.

The above described defects are mainly caused by the position adjusting assembly of the LED chip being composed of a plurality of components, and the position adjustments in the vertical and horizontal directions are interfered by a restoring spring.

SUMMARY

According to one aspect of the present disclosure, an LED mounting base is provided in the present disclosure, the LED mounting base includes a sliding block base and a pedestal for mounting an LED chip on a front end surface thereof, and the pedestal is disposed on a front end surface of the sliding block base and the pedestal reciprocates along the length direction of the sliding block base by a position locking mechanism.

The position locking mechanism is a sliding slot which is disposed on the front end surface of the sliding block base and parallel to a length direction of the sliding block base, and one end of the sliding slot is a blind end, and the other end of the sliding slot is an open end;

after the pedestal being disposed in the sliding slot, the front end surface of the pedestal is parallel to the front end surface of the sliding block base.

A spiral restoring spring is disposed between one end of the above described pedestal and the blind end.

At least two blind holes uniformly disposed along a length direction of the above described sliding slot are disposed on an inner end surface of the sliding slot, a first contact-press structure is mounted in the blind hole;

the first contact-press structure includes a spiral spring, a hollow clamping cap and a steel ball with a radius larger than an inner diameter of a front end outlet of the hollow clamping cap, all of which are sequentially mounted in the blind hole from an inside to an outside; under the action of the spiral spring, the steel ball is touched against the front end outlet of the hollow clamping cap after entering the hollow clamping cap from a back end of the hollow clamping cap, and a part of a spherical surface of the steel ball is exposed at an outside of the front end outlet of the hollow clamping cap to contact against the back end surface of the pedestal;

a top surface of the pedestal is provided with at least two uniformly distributed grooves along a length direction of the pedestal, a second contact-press structure with the same structure as the first contact-press structure is mounted in the groove for pressing against an inner top surface of the sliding slot opposite to the top surface of the pedestal.

An inner recess portion is disposed in the length direction of the above described sliding slot, and the inner recess portion is downwardly extended from a top surface of the sliding block base to a bottom surface of the sliding block base;

two locating pins arranged along a length direction are disposed on a bottom surface of the pedestal, and the locating pins are downwardly extended to a lower edge of the inner recess portion to limit a distance that the pedestal moves left and right in the sliding slot.

The above described position locking mechanism is a pedestal blind hole which is disposed on the front end surface of the sliding block base and parallel to the length direction of the sliding block base, and a notch is disposed on a front end surface of the pedestal blind hole, such that an LED chip is mounted on the front end surface of the pedestal which is inserted into the pedestal blind hole.

A spiral restoring spring is disposed between one end of the above described pedestal (2) and the bottom end of the pedestal blind hole.

A cylindrical pin perpendicular to a back end surface of the above described pedestal is disposed on the back end surface thereof, an internal groove for reciprocating the cylindrical pin is disposed on an inner wall of the pedestal blind hole corresponding to the cylindrical pin.

According to another aspect of the present disclosure, an adjustment mechanism includes the above described LED mounting base, a top surface of the sliding block base is provided with four position limiting blind holes which are connected in a rectangular shape and a screw hole disposed at the rectangle center, a vertical adjusting screw perpendicular to the top surface of the sliding block base is screwed connection with the screw hole;

a vertical spiral spring with an end surface parallel to the top surface of the sliding block base is disposed in the position limiting blind hole;

a horizontal adjustment member is disposed at the other end of the pedestal, the horizontal adjustment member is composed of a horizontal screw and an convex block threaded connection with the horizontal screw, the convex block is disposed between the other end of the pedestal and the horizontal screw; a screw arbor of the horizontal screw is perpendicular to the other end of the pedestal.

According to yet another aspect of the present disclosure, A red dot sighting device including the above described adjustment mechanism includes a bottom base, the adjustment mechanism is mounted in a chamber of a back end of the bottom base;

the front end surface of the pedestal is in contact against a front end surface of the chamber under an action of a first contact-press structure;

the horizontal screw extends from an outside of the chamber to an inside of the chamber and is threaded connection with the convex block (15) disposed in the chamber;

the vertical adjusting screw inwardly extends from the outside of a top of the chamber to the inside of the chamber and is threaded connection with the screw hole.

A red dot sighting device includes a bottom base and an LED mounting base mounted in a chamber of a back end of the bottom base, the LED mounting base includes a sliding block base and a pedestal for mounting a LED chip on the front end surface thereof;

a screw hole is respectively disposed at the left and right corners of a back end of the chamber a bolt is mounted in the screw hole, and a connecting screw hole coaxial with the bolt is disposed on a bolt head of the bolt;

a bolt head edge of the bolt extends to an inner side of a bottom surface of the sliding block base to achieve a jam of the sliding block base.

An annular groove is disposed on a circumferential side wall of a bolt bottom end of the above described vertical adjusting screw, a jam of the sliding block base is achieved by inserting a U-shaped limit card into the annular groove.

The present disclosure will be described in detail below with reference to the accompanying drawings and embodiments.

DETAILED DESCRIPTION

Figure 1:
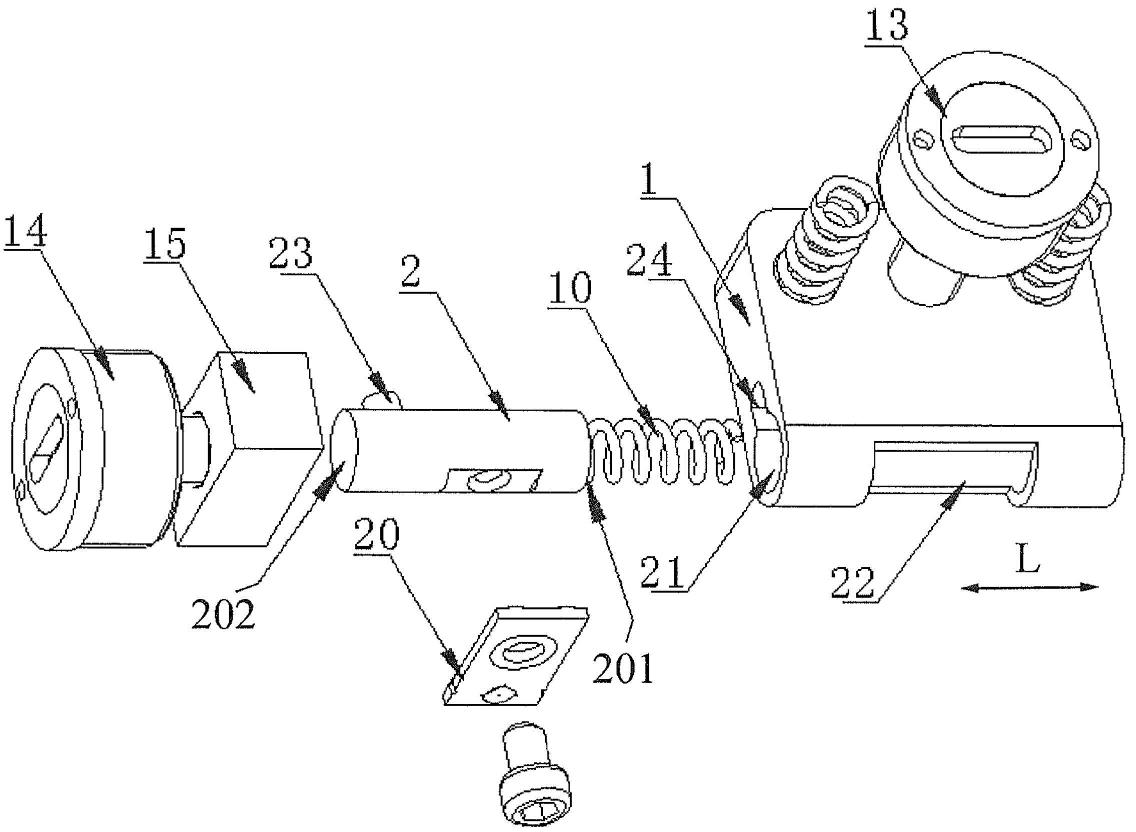
FIG. 1 is an exploded view of a structure of an LED mounting base adjustment mechanism in which a position locking mechanism is a pedestal blind hole.

In order to overcome the existed problem in the existing red dot sighting device that low efficiency, poor precision and poor reliability is existed in the adjustment of the light source emitting direction, an LED mounting base is provided in the present embodiment, which refers to FIG. 1 in detail. The LED mounting base includes a sliding block base 1 and a pedestal 2 for mounting an LED chip 20 on the front end surface thereof (The LED chip 20 is mounted on the pedestal 2 by a screw. In this way, the fine adjustment of the LED 20 can be achieved by the screw to ensure the mounting precision of the LED chip). The pedestal 2 is disposed on the front end surface of the sliding block base 1, and the pedestal 2 is reciprocated along the length direction L of the sliding block base 1 by a position locking mechanism.

As can be seen from FIG. 1, the position locking mechanism is a pedestal blind hole 21 which is disposed on the front end surface of the sliding block base 1 and parallel to the length direction L of the sliding block base 1, and a notch 22 is disposed on the front end surface of the pedestal blind hole 21, such that the LED chip 20 is mounted on the front end surface of the pedestal 2 which is inserted into the pedestal blind hole 21. A spiral restoring spring 10 is disposed between one end of the pedestal 2 and the bottom end of the pedestal blind hole 21.

A cylindrical pin 23 is disposed on the back end surface of the pedestal 2 and is perpendicular to the back end surface, and an internal groove 24 for reciprocating the cylindrical pin 23 is disposed on an inner wall of the pedestal blind hole 21 corresponding to the cylindrical pin 23.

Figure 2:
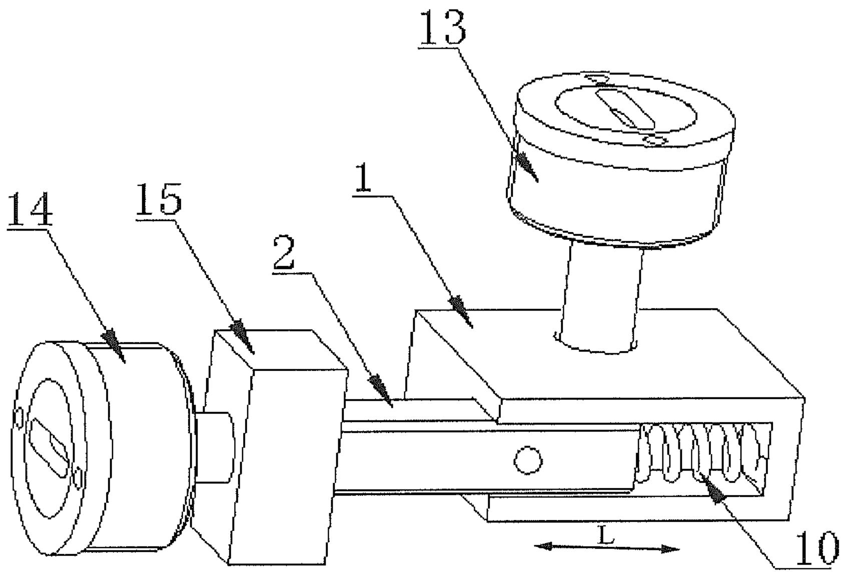
FIG. 2 is a structure schematic view of an LED mounting base adjustment mechanism in which a position locking mechanism is a sliding slot.
Figure 3:
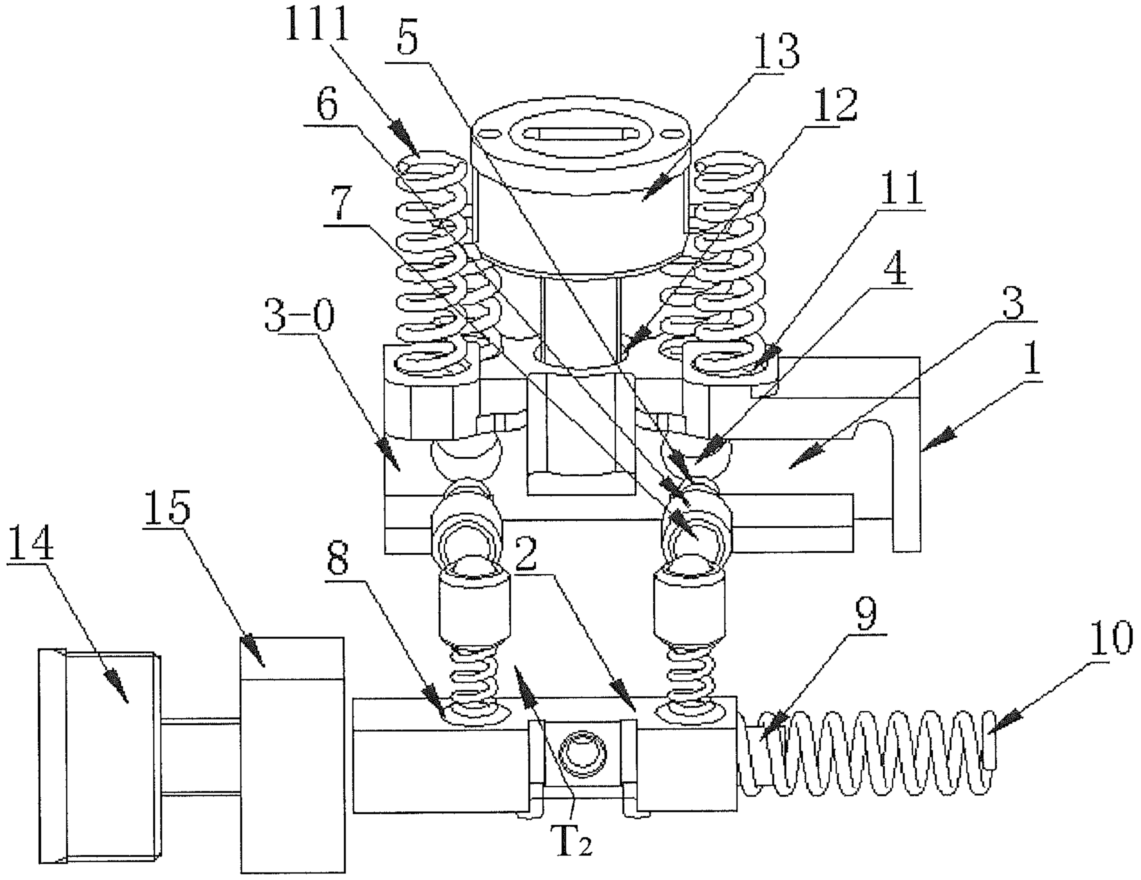
FIG. 3 is an exploded view of an structure of an LED mounting base with a gap eliminating mechanism.
Figure 4:
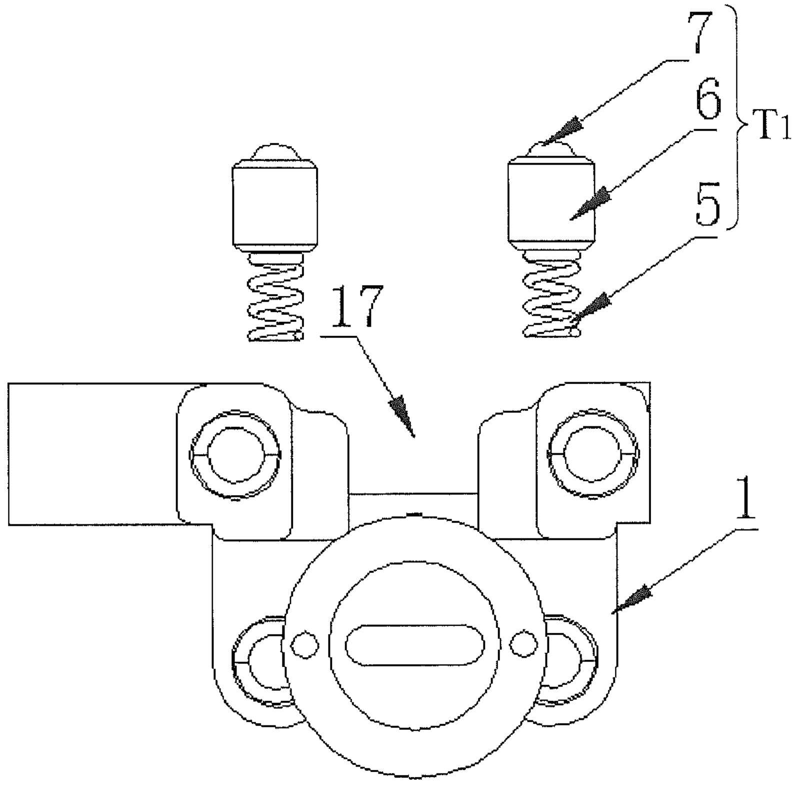
FIG. 4 is a schematic view of an inner recess portion arrangement of an LED mounting base adjustment mechanism.

As can be seen from FIGS. 2 and 3, the position locking mechanism is a sliding slot 3 which is disposed on the front end surface of the sliding block base 1 and parallel to the length direction L of the sliding block base 1, one end of the sliding slot 3 is a blind end, and the other end of the sliding slot 3 is an open end. After the pedestal 2 being disposed in the sliding slot 3, the front end surface of the pedestal 2 is flush with the front end surface of the sliding block base 1. A spiral restoring spring 10 is disposed between one end 201 of the pedestal 2 and the blind end of the sliding slot 3. The components of such mounting base are significantly reduced. The assembly of the pedestal 2 and the sliding block base 1 is achieved by the sliding slot 3, which ensures that the pedestal 2 is not disturbed by the other external force when the pedestal 2 moves towards left or right, and the stability, reliability and precision of the adjustment are improved.

At the same time, in order to further reduce the assembly gap, the sliding slot 3 provided in the present embodiment is shown in FIG. 3, and at least two blind holes 4 uniformly disposed along the length direction of the sliding slot 3 are disposed on the inner end surface 3-0 thereof. A first contact-press structure T1 is mounted in the blind hole 4. The first contact-press structure T1 includes a spiral spring 5, a hollow clamping cap 6 and a steel ball 7 with a radius larger than the inner diameter of the front end outlet of the hollow clamping cap 6, and all of which are sequentially mounted in the blind hole 4 from the inside to the outside as shown in FIG. 2. Under the action of the spiral spring 5, the steel ball 7 is touched against the front end outlet of the hollow clamping cap 6 after entering the hollow clamping cap 6 from the back end of the hollow clamping cap 6. A part of the spherical surface of the steel ball 7 is exposed at the front end outlet of the hollow clamping cap 6 to contact against the back end surface of the pedestal 2, thereby ensuring that the pedestal 2 is always received contact force, thereby the front end surface of the pedestal 2 is contacted against the front end surface of the chamber 19 under the action of the contact-press spiral spring shown in FIG. 5, thereby effectively overcoming spring interference in the vertical direction in the existing technology causing the LED mounting base to offset and then affecting the adjusting precision and reliability.

Referring to FIG. 3, the top surface of the pedestal 2 is provided with at least two uniformly distributed grooves 8 along the length direction of the pedestal 2. A second contact-press structure T2 with the same structure as the first contact-press structure T1 is mounted in the groove 8 for pressing against the inner top surface of the sliding slot 3 opposite to the top surface of the pedestal 2. In this way, the pedestal 2 is ensured always to receive a downward pressure during the left and right adjusting process, and the adjusting deviation caused by the gap influence can be effectively avoided, then the stability, reliability and precision of the adjustment are improved.

Figure 5:
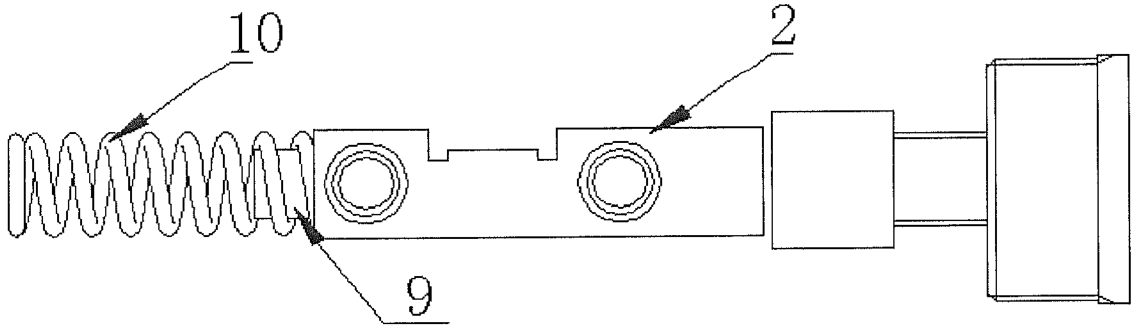
FIG. 5 is a schematic view of a pedestal in which a position limit pin and a spiral restoring spring are disposed at the other end thereof.
Figure 6:
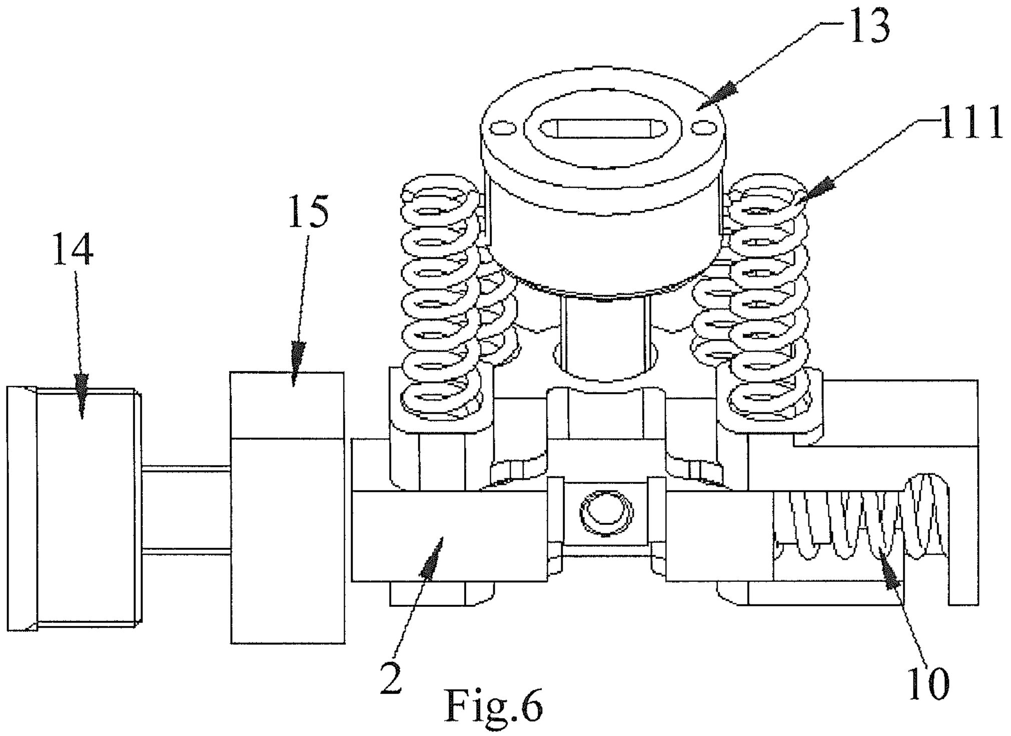
FIG. 6 is a schematic view of an assembled LED mounting base adjustment mechanism in which a position locking mechanism is a sliding slot.

The end surface of one end 201 of the pedestal 2 is provided with a position limit pin 9 protruding from the end surface (clearly visible from FIG. 5). A spiral restoring spring 10 is disposed between one end 201 of the pedestal 2 and the blind end of the sliding slot 3. One end of the spiral restoring spring 10 is pressed against the inside surface of the blind end, and the other end of the spiral restoring spring 10 is sleeved on the position limit pin 9 and contacted against the end surface of the one end 201 of the pedestal 2. The assistance for the horizontal adjustment of the position of the LED mounting base and the effective elimination of the fit clearance can be achieved by the spiral restoring spring 10.

In order to effectively limit the adjustment of the left and right positions of the pedestal 2 in the horizontal direction, an inner recess portion 17 shown in FIG. 3 is disposed in the length direction of the sliding slot 3 in the present embodiment, and the inner recess portion 17 downwardly extends from the top surface of the sliding block base 1 to the bottom surface of the sliding block base 1. Two locating pins 18 shown in FIG. 7 and arranged in the length direction are disposed on the bottom surface of the pedestal 2, and the locating pins 18 are downwardly extended to the lower edge of the inner recess portion 17 to limit the left and right movement distance of the pedestal 2 within the slide slot 3.

An adjustment mechanism including the above described various LED mounting base is shown in FIGS. 1, 2, 3, 4 and 6. In an embodiment, the top surface of the sliding block base 1 is provided with four position limiting blind holes 11 which are connected in a rectangular shape and a screw hole 12 disposed at the center of the rectangle. A vertical adjusting screw 13 perpendicular to the top surface of the sliding block base 1 is screwed with the screw hole 12.

Figure 8:
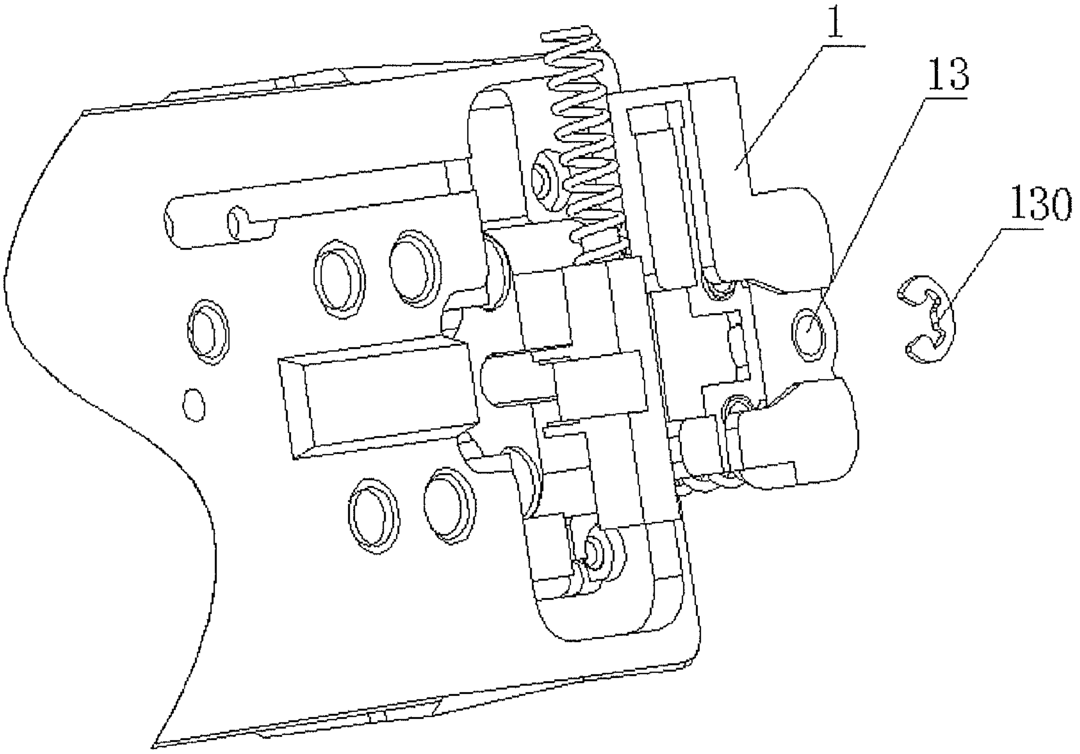
FIG. 8 is a schematic view of a U-shaped position limit card arrangement.

Referring to FIG. 8, in order to ensure a stable connection of the vertical adjusting screw 13 with the sliding block base 1 through the screw hole 12, the circumferential side wall of the bolt bottom end (ie. an end screwing into the bottom surface of the sliding block base 1 through the screw hole 12) of the vertical adjusting screw 13 is provided with an annular groove. The position limit of the vertical adjusting screw 13 is achieved by a U-shaped position limit card 130 inserted into the annular groove. That is, a pulling force of which the direction is perpendicular to the length direction of the vertical adjusting screw 13 is generated, and the pulling force is perpendicular to the rotating direction of the spiral. When the spiral is rotated, the spiraling frictional force of the spiral is increased due to the pulling force, thereby effectively preventing the spiral rotation, and achieving the effective relaxation position limit of the vertical adjusting screw 13.

Figure 9:
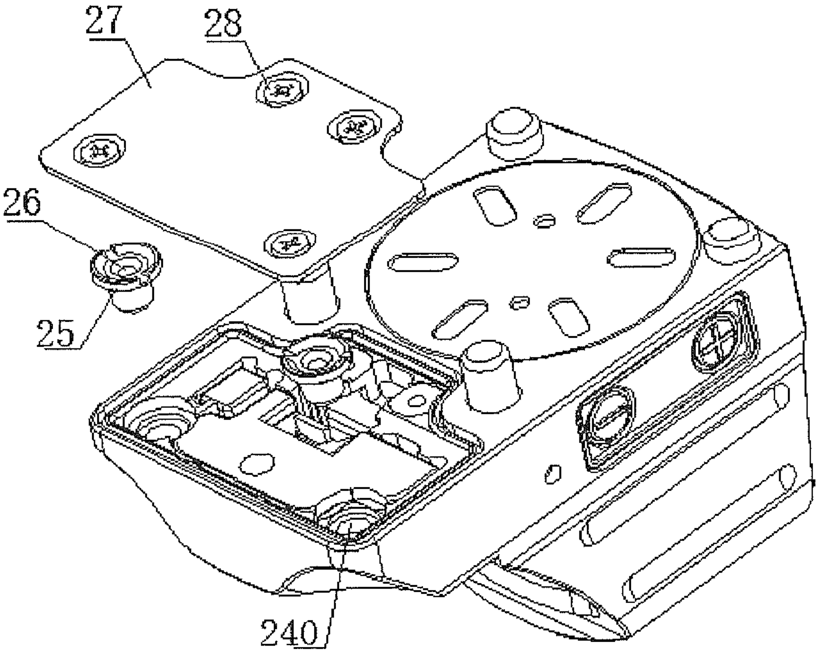
FIG. 9 is a schematic view of the bottom fixation of the LED mounting base.

In order to further improve the adjustment stability of the sliding block base 1 and ensure the stability of the sliding block base 1 when the position is adjusted in the vertical or horizontal direction, a position limit mounting structure shown in FIG. 9 is provided in the present embodiment. That is, a screw hole 240 is respectively disposed at the left and right corners of the back end of the mounting chamber (ie. the chamber 19) that mounting the sliding block base, and the mounting chamber is at back end of the red dot sighting device. A bolt 25 is mounted in the screw hole 240, and a connecting screw hole 26 coaxial with the bolt 25 is disposed on the bolt head of the bolt 25. The base sealing is achieved through the connecting screw hole 26 engaging with the connecting screw 28 on the bottom cover 27. In this way, the jam position limit of the sliding block base 1 is achieved by means of the bolt head edge of the bolt 25 extending to the inner side of the bottom surface of the sliding block base 1.

A vertical spiral spring 111 with an end surface parallel to the top surface of the sliding block base 1 is disposed in the position limiting blind hole 11. A horizontal adjustment member is disposed at the other end 202 of the pedestal 2. The horizontal adjustment member includes a horizontal screw 14 and a convex block 15 threaded connection with the horizontal screw 14. The convex block 15 is disposed between the other end 202 of the pedestal 2 and the horizontal screw 14. The screw arbor of the horizontal screw 14 is perpendicular to the other end 202 of the pedestal 2.

Figure 7:
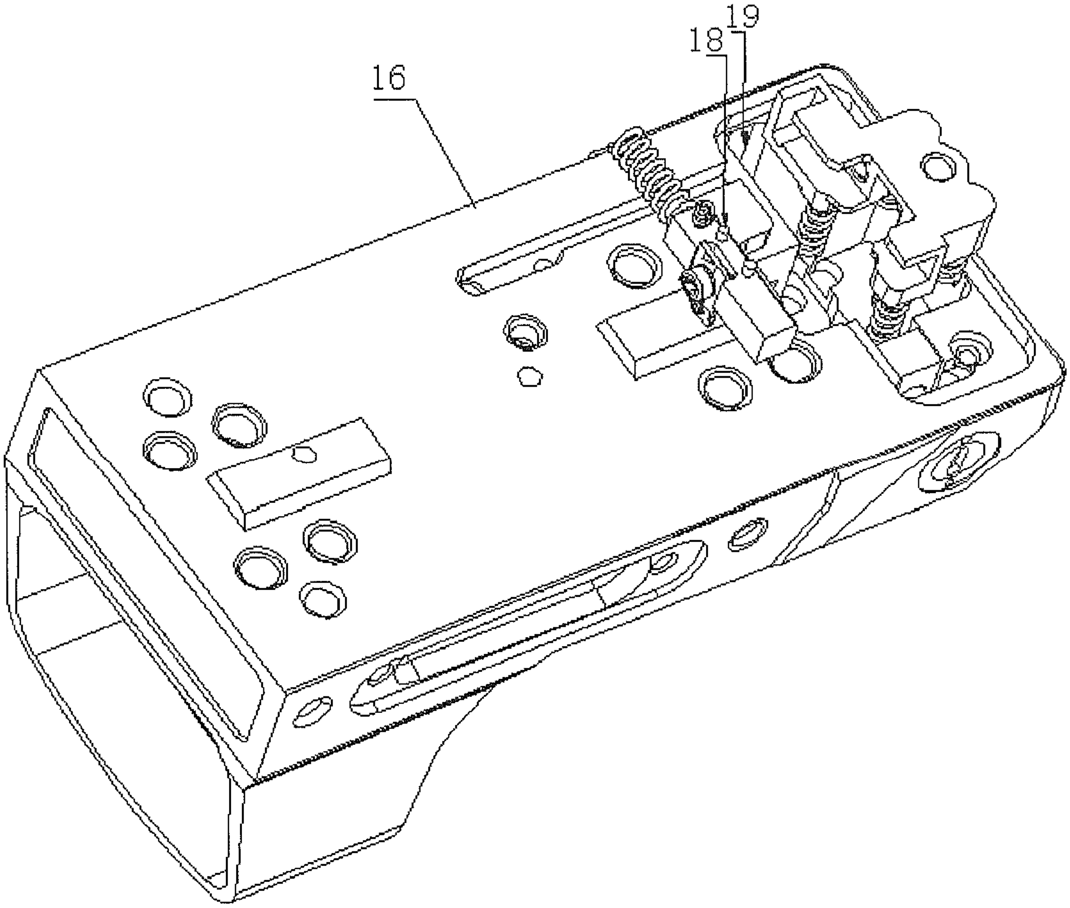
FIG. 7 is a structure schematic view of a red dot sighting device.

Meanwhile, a red dot sighting device with the above described adjustment mechanism shown in FIG. 7 includes the bottom base 16 shown in FIG. 7. The adjustment mechanism is mounted in the chamber 19 of the back end of the bottom base 16. The front end surface of the pedestal 2 is in contact against the front end surface of the chamber 19 under the action of the first contact-press structure T1. The horizontal screw 14 extends from the outside of the chamber 19 to the inside of the chamber 19 and is threaded connection with the convex block 15 disposed in the chamber 19. The vertical adjusting screw 13 inwardly extends from the outside of the top of the chamber 19 to the inside of the chamber 19 and is threaded connection with the screw hole 12. An inner recess portion 17 is disposed in the length direction of the sliding slot 3, and the inner recess portion 17 downwardly extends from the top surface of the sliding block base 1 to the bottom surface of the sliding block base 1. Two locating pins 18 arranged in the length direction are disposed on the bottom surface of the pedestal 2. The locating pins 18 downwardly extend to the lower edge of the inner recess portion 17 to limit the distance that the pedestal 2 moves left and right in the sliding slot 3.

Through the LED mounting base and the adjustment mechanism provided in the above described various embodiments, the LED mounting base and the adjustment mechanism can be assembled with the chamber on the bottom base. During the process of the position adjustment for the LED mounting pedestal 2 in a single direction, position changes of the sliding block base 1 or the pedestal 2 in the vertical direction or the horizontal direction can be achieved only by rotating the vertical adjusting screw 13 or the horizontal screw 14. During the process, because of the pedestal 2 and the sliding block base 1 being matched through the sliding slot 3, and the action of the first contact-press structure T1 and the second contact-press structure T2, the pedestal 2 and the sliding block base 1 are always in close contact with the sliding slot, and are in close contact with the front end surface of the chamber. It is ensured that during the adjusting process, the pedestal 2 is moved in a straight line without skewing occurrence, the adjusting spring interference in the present technology is effectively evaded, and the precision, reliability and stability of the adjustment are improved.

The advantages of the present disclosure are as flowing: the LED mounting base has fewer components, is modular in design and more compact, and is less affected by the components gap; the entire adjustment mechanism is simple in mechanism constitute, eliminates the interference influence of the spring, is without the skew phenomenon, and is with high precision, fast assembly speed and high reliability; the red dot sighting device has an accurate light emitting direction, fast adjustment and high accuracy; the resultant force generated when adjusted in the two-dimensional directions of up and down as well as the left and right is decomposed into a single direction, the increase of the frictional force caused by the resultant force of the spring force in different directions is eliminated, and the influence of the precision difference, the interference phenomenon and the reliability of the adjustment mechanism due to the parts gap caused by the tolerance transmission is eliminated; there is no skew or stagnation phenomenon caused by the adjustment in two directions; the position limit device is added at the adjusting limitation to prevent the parts damage caused by the over adjustment. Thereby, the positioning precision and reliability of the LED adjustment mechanism of the red dot sighting device is improved, the processing difficulty of the parts are reduced, and the production efficiency is improved.

What is claimed is:

1. An LED mounting base, comprising a sliding block base and a pedestal for mounting an LED chip on a front end surface thereof, and the pedestal is disposed on a front end surface of the sliding block base and the pedestal reciprocating along the length direction of the sliding block base by a position locking mechanism, wherein the position locking mechanism is a sliding slot which is disposed on the front end surface of the sliding block base and parallel to a length direction of the sliding block base, and one end of the sliding slot is a blind end, and the other end of the sliding slot is an open end;

after the pedestal being disposed in the sliding slot, the front end surface of the pedestal is flush with the front end surface of the sliding block base.

2. The LED mounting base of claim 1, wherein a spiral restoring spring is disposed between one end of the pedestal and the blind end.

3. The LED mounting base of claim 2, wherein at least two blind holes uniformly disposed along a length direction of the sliding slot are disposed on an inner end surface of the sliding slot, a first contact-press structure is mounted in the blind hole;

the first contact-press structure comprises a spiral spring, a hollow clamping cap and a steel ball with a radius larger than an inner diameter of a front end outlet of the hollow clamping cap, all of which are sequentially mounted in the blind hole from an inside to an outside; under the action of the spiral spring, the steel ball is touched against the front end outlet of the hollow clamping cap after entering the hollow clamping cap from a back end of the hollow clamping cap, and a part of a spherical surface of the steel ball is exposed at an outside of the front end outlet of the hollow clamping cap to contact against the back end surface of the pedestal;

a top surface of the pedestal is provided with at least two uniformly distributed grooves along a length direction of the pedestal, a second contact-press structure with the same structure as the first contact-press structure is mounted in the groove for pressing against an inner top surface of the sliding slot opposite to the top surface of the pedestal.

4. The LED mounting base of claim 3, wherein an inner recess portion is disposed in the length direction of the sliding slot, and the inner recess portion is downwardly extended from a top surface of the sliding block base to a bottom surface of the sliding block base;

two locating pins arranged along a length direction are disposed on a bottom surface of the pedestal, and the locating pins are downwardly extended to a lower edge of the inner recess portion to limit a distance that the pedestal moves left and right in the sliding slot.

5. An LED mounting base, comprising a sliding block base and a pedestal for mounting an LED chip on a front end surface thereof, and the pedestal is disposed on a front end surface of the sliding block base and the pedestal reciprocating along the length direction of the sliding block base by a position locking mechanism, wherein the position locking mechanism is a pedestal blind hole which is disposed on the front end surface of the sliding block base and parallel to the length direction of the sliding block base, and a notch is disposed on a front end surface of the pedestal blind hole, such that an LED chip is mounted on the front end surface of the pedestal which is inserted into the pedestal blind hole.

6. The LED mounting base of claim 5, wherein a spiral restoring spring is disposed between one end of the pedestal and the bottom end of the pedestal blind hole.

7. The LED mounting base of claim 6, wherein a cylindrical pin perpendicular to a back end surface of the pedestal is disposed on the back end surface thereof, an internal groove (for reciprocating the cylindrical pin is disposed on an inner wall of the pedestal blind hole corresponding to the cylindrical pin.

8. An adjustment mechanism comprising the LED mounting base according to claim 2, wherein a top surface of the sliding block base is provided with four position limiting blind holes which are connected in a rectangular shape and a screw hole disposed at the rectangle center, a vertical adjusting screw perpendicular to the top surface of the sliding block base is screwed connection with the screw hole;

a vertical spiral spring with an end surface parallel to the top surface of the sliding block base is disposed in the position limiting blind hole;

a horizontal adjustment member is disposed at the other end of the pedestal, the horizontal adjustment member comprises a horizontal screw and a convex block threaded connection with the horizontal screw, the convex block is disposed between the other end of the pedestal and the horizontal screw; a screw arbor of the horizontal screw is perpendicular to the other end of the pedestal.

9. An adjustment mechanism comprising the LED mounting base according to claim 3, wherein a top surface of the sliding block base is provided with four position limiting blind holes which are connected in a rectangular shape and a screw hole disposed at the rectangle center, a vertical adjusting screw perpendicular to the top surface of the sliding block base is screwed connection with the screw hole;

a vertical spiral spring with an end surface parallel to the top surface of the sliding block base is disposed in the position limiting blind hole;

a horizontal adjustment member is disposed at the other end of the pedestal, the horizontal adjustment member comprises a horizontal screw and a convex block threaded connection with the horizontal screw, the convex block is disposed between the other end of the pedestal and the horizontal screw; a screw arbor of the horizontal screw is perpendicular to the other end of the pedestal.

10. An adjustment mechanism comprising the LED mounting base of claim 4, wherein the top surface of the sliding block base is disposed with four position limiting blind holes which are connected in a rectangular shape and a screw hole disposed at the rectangle center; a vertical adjusting screw perpendicular to the top surface of the sliding block base is screwed joint with the screw hole;

a vertical spiral spring with an end surface parallel to the top surface of the sliding block base is disposed in the position limiting blind hole;

a horizontal adjustment member is disposed at the other end of the pedestal, the horizontal adjustment member comprises a horizontal screw and a convex block threaded connection with the horizontal screw, the convex block is disposed between the other end of the pedestal and the horizontal screw; a screw arbor of the horizontal screw is perpendicular to the other end of the pedestal.

11. A red dot sighting device comprising the adjustment mechanism according to claim 8 comprises a bottom base, wherein the adjustment mechanism is mounted in a chamber of a back end of the bottom base;

the front end surface of the pedestal is in contact against a front end surface of the chamber under an action of a first contact-press structure;

the horizontal screw extending from an outside of the chamber to an inside of the chamber is threaded connection with the convex block disposed in the chamber;

the vertical adjusting screw inwardly extends from the outside of a top of the chamber to the inside of the chamber and is threaded connection with the screw hole.

12. A red dot sighting device comprising the adjustment mechanism according to claim 9 comprises a bottom base, wherein the adjustment mechanism is mounted in a chamber of a back end of the bottom base;

the front end surface of the pedestal is in contact against a front end surface of the chamber under an action of a first contact-press structure;

the horizontal screw extending from an outside of the chamber to an inside of the chamber is threaded connection with the convex block disposed in the chamber;

the vertical adjusting screw inwardly extends from the outside of a top of the chamber to the inside of the chamber and is threaded connection with the screw hole.

13. A red dot sighting device comprising the adjustment mechanism according to claim 10 comprises a bottom base, wherein the adjustment mechanism is mounted in a chamber of a back end of the bottom base;

the front end surface of the pedestal is in contact against a front end surface of the chamber under an action of a first contact-press structure;

the horizontal screw extending from an outside of the chamber to an inside of the chamber is threaded connection with the convex block disposed in the chamber;

the vertical adjusting screw inwardly extends from the outside of a top of the chamber to the inside of the chamber and is threaded connection with the screw hole.

14. The adjustment mechanism of the LED mounting base according to claim 8, wherein an annular groove is provided on a circumferential side wall of a bolt bottom end of the vertical adjusting screw, a jam of the sliding block base is achieved by inserting an U-shaped position limit card into the annular groove.

15. The LED mounting base of claim 1, wherein at least two blind holes uniformly disposed along a length direction of the sliding slot are disposed on an inner end surface of the sliding slot, a first contact-press structure is mounted in the blind hole;

the first contact-press structure comprises a spiral spring, a hollow clamping cap and a steel ball with a radius larger than an inner diameter of a front end outlet of the hollow clamping cap, all of which are sequentially mounted in the blind hole from an inside to an outside; under the action of the spiral spring, the steel ball is touched against the front end outlet of the hollow clamping cap after entering the hollow clamping cap from a back end of the hollow clamping cap, and a part of a spherical surface of the steel ball is exposed at an outside of the front end outlet of the hollow clamping cap to contact against the back end surface of the pedestal;

a top surface of the pedestal is provided with at least two uniformly distributed grooves along a length direction of the pedestal, a second contact-press structure with the same structure as the first contact-press structure is mounted in the groove for pressing against an inner top surface of the sliding slot opposite to the top surface of the pedestal.

16. An adjustment mechanism comprising the LED mounting base according to claim 6, wherein a top surface of the sliding block base is provided with four position limiting blind holes which are connected in a rectangular shape and a screw hole disposed at the rectangle center, a vertical adjusting screw perpendicular to the top surface of the sliding block base is screwed connection with the screw hole;

a vertical spiral spring with an end surface parallel to the top surface of the sliding block base is disposed in the position limiting blind hole;

a horizontal adjustment member is disposed at the other end of the pedestal, the horizontal adjustment member comprises a horizontal screw and a convex block threaded connection with the horizontal screw, the convex block is disposed between the other end of the pedestal and the horizontal screw; a screw arbor of the horizontal screw is perpendicular to the other end of the pedestal.

17. A red dot sighting device comprising the adjustment mechanism according to claim 16 comprises a bottom base, wherein the adjustment mechanism is mounted in a chamber of a back end of the bottom base;

the front end surface of the pedestal is in contact against a front end surface of the chamber under an action of a first contact-press structure;

the horizontal screw extending from an outside of the chamber to an inside of the chamber is threaded connection with the convex block disposed in the chamber;

the vertical adjusting screw inwardly extends from the outside of a top of the chamber to the inside of the chamber and is threaded connection with the screw hole.

18. The adjustment mechanism of the LED mounting base according to claim 16, wherein an annular groove is provided on a circumferential side wall of a bolt bottom end of the vertical adjusting screw, a jam of the sliding block base is achieved by inserting an U-shaped position limit card into the annular groove.

19. A red dot sighting device, comprising a bottom base and an LED mounting base mounted in a chamber of a back end of the bottom base, wherein the LED mounting base comprising a sliding block base and a pedestal for mounting a LED chip on the front end surface thereof;

a screw hole is respectively disposed at the left and right corners of a back end of the chamber, a bolt is mounted in the screw hole, and a connecting screw hole coaxial with the bolt is disposed on a bolt head of the bolt;

a bolt head edge of the bolt extends to an inner side of a bottom surface of the sliding block base to achieve a jam of the sliding block base.

* * * * *